Nov. 6, 1934.  F. W. ZINK  1,980,149
REAR VIEW MIRROR
Filed May 29, 1933
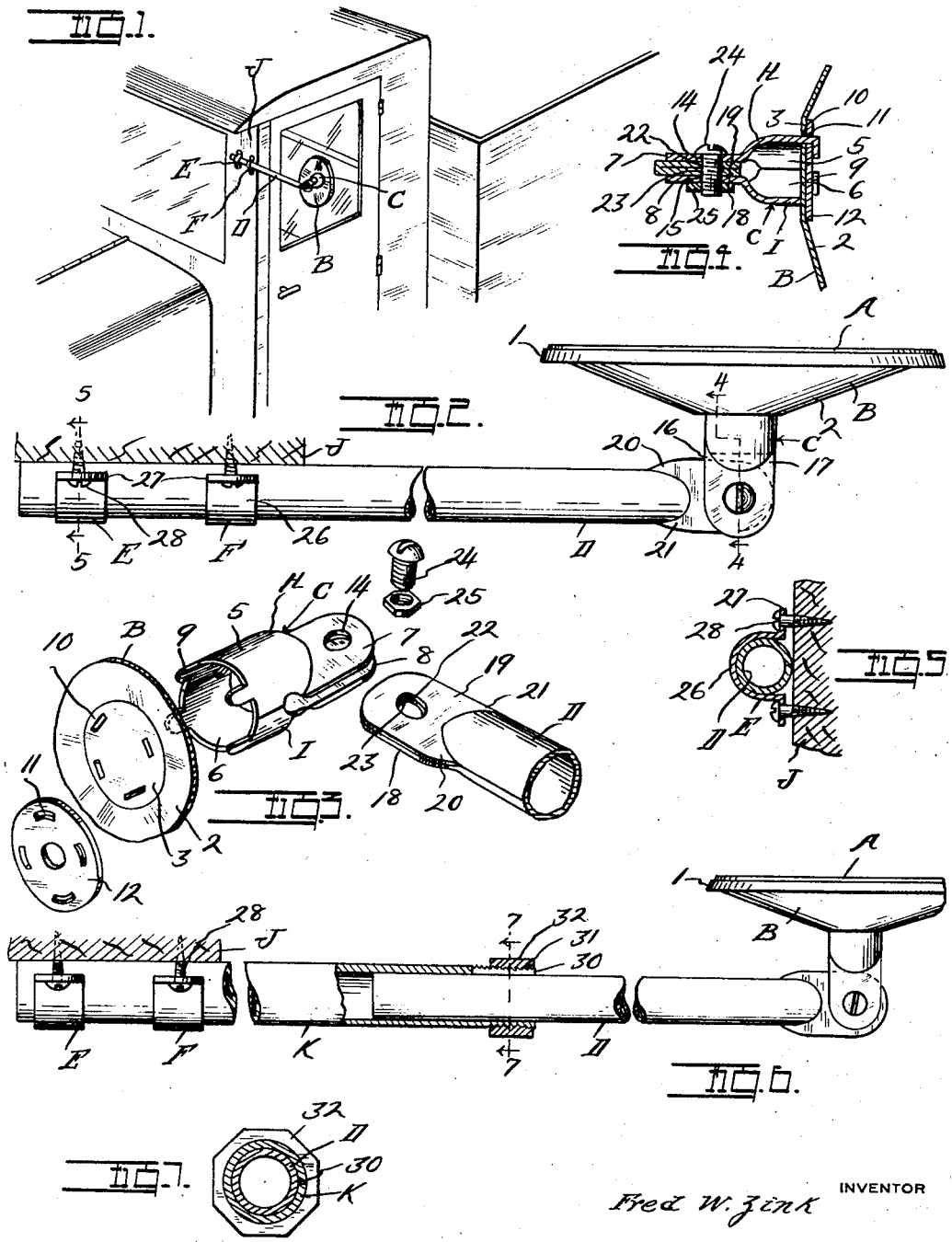
INVENTOR
Fred W. Zink
BY
ATTORNEYS Patented Nov. 6, 1934

1,980,149

UNITED STATES PATENT OFFICE 1,980,149

REAR VIEW MIRROR

Fred W. Zink, Detroit, Mich., assignor to Kales Stamping Company, Detroit, Mich., a corporation of Michigan Application May 29, 1933, Serial No. 673,531

4 Claims. (Cl. 45—97)

This invention relates generally to rear view mirrors and refers more particularly to those designed for use upon trucks and other commercial vehicles.

One of the essential objects of the invention is to provide a mirror of this type wherein all of the metal parts except the screws, nut and bolt are stampings.

Another object is to provide a rear view mirror wherein one of the stampings is in the form of a relatively long tube and is mounted for both rotary and longitudinal movements on the vehicle.

Another object is to provide a rear view mirror wherein a pair of complementary stampings form a relatively short tube and are terminally connected to the long tube just mentioned and to another stamping which forms the back plate for and carries the glass part of the device.

Another object is to provide a rear view mirror wherein the connection between the tubes permits the glass part to be moved in the arc of a circle relative to the long tube and to move in unison with the long tube when it is moved longitudinally or rotated.

Another object is to provide a rear view mirror wherein the connection between the short tube and back plate includes a plurality of lugs which project from the complementary stampings and cooperate with a disc upon the inner side of the back plate to secure the plate firmly against the free ends of said stampings.

Other objects, advantages and novel details of construction of this invention will be made more apparent as this description proceeds, especially when considered in connection with the accompanying drawing wherein:

Figure 1 is a fragmentary perspective view of a truck with a rear view mirror embodying my invention applied to the cab thereof;

Figure 2 is an enlarged top plan view of the mirror assembly and showing a portion of the cab in section;

Figure 3 is a group perspective of the back plate, disc, short arm, bolt, nut and long arm with parts of the back plate and long arm broken away and in section;

Figure 4 is a sectional view taken on the line 4—4 of Figure 2;

Figure 5 is a sectional view taken on the line 5—5 of Figure 2;

Figure 6 is a view similar to Figure 2 but showing a slightly modified construction;

Figure 7 is a sectional view taken on the line 7—7 of Figure 6.

Referring now to the drawing, A is the glass part; B is the back plate for said part; C and D, respectively, are the supporting tubes for the glass part and back plate; and E and F, respectively, are the attaching brackets of a rear view mirror assembly embodying my invention. As shown, the glass part A is conventional in form and is held by a marginal flange 1 of the back plate B. Preferably the body 2 of the back plate is dished and is provided at its center with a flat portion 3 substantially parallel to the glass part A. The top C is relatively short and preferably comprises two complementary stampings H and I, respectively, having transversely curved portions 5 and 6 and flattened portions 7 and 8, respectively. The free ends of said transversely curved portions 5 and 6 abut the flat portion 3 of the back plate and have lugs 9 projecting endwise therefrom through slots 10 in the flat portion 3 of the back plate and through slots 11 in a disc 12 upon the inner side of said portion and bent over the inner side of said disc. The flattened portions 7 and 8 are spaced slightly apart and have aligned openings 14 and 15 therein. Preferably these flattened portions 7 and 8 extend upon opposite sides of the transversely curved portions 5 and 6 as at 16 and 17, respectively, so that the joints between the transversely curved and flattened portions are substantially U-shaped. Thus a stronger construction is provided and breakage at such points is effectively prevented. The long tube D is a single stamping open at one end and closed at the other by flattened portions 18 and 19, respectively. Preferably these flattened portions 18 and 19 are flat against one another and are received between the flattened portions 7 and 8 of the tube C. Such portions 18 and 19 also extend upon opposite sides of the tubular portion of the tube D as at 20 and 21, respectively, and have aligned openings 22 and 23, respectively, therein which register with the openings 14 and 15 in the flattened portions 7 and 8 of the short tube. Any suitable means such as the bolt 24 engaging the registering openings 14, 15, 22 and 23 and a clamping nut 25 may be used to connect the tube C to the tube D and to hold the said tube C in adjusted position relative to the tube D. The brackets E and F have U-shaped portions 26 straddling the tube D and have laterally projecting attaching flanges 27 at opposite sides thereof fastened by screws 28 to the cab J of the vehicle. As shown, the flanges 27 are secured in spaced relation to the cab so that a tube D will be effectively clamped against said cab when the screws 28 are tightened but may be moved longitudinally or rotated when they are loosened.

In Figures 6 and 7 I have illustrated a slight modification in which the tube D telescopically engages another tube K which in turn is clamped by the brackets E and F and screws 28 to the cab J. With this construction the tube K is provided at its outer end with a longitudinally split portion 30 provided with external threads 31. A nut 32 is adjustable on these threads to bind the longitudinally split portion 30 against the tube D so that the latter will be held in adjusted position relative to the tube K. Otherwise the construction is the same as that illustrated in Figures 1 to 5, inclusive.

While an embodiment of the invention has been described herein somewhat in detail, it will be immediately apparent to those skilled in the art that various changes may be resorted to without departing from the spirit and scope of this invention, and to this end reservation is made to make such changes as may come within the purview of the accompanying claims.

What I claim as my invention is:

1. In a rear view mirror, a back plate for a glass element, and a mounting for said plate including a tube mounted for both longitudinal and rotary movements, and a pair of pivotally connected tubes, one being mounted for both rotary and longitudinal movements in the first mentioned tube, and the other being secured to said plate.

2. A rear view mirror mounting attachable to a side of a suitable support and comprising a vertically extending mirror holder, two horizontally disposed tubes, one being fixed to said holder and pivoted to the second tube whereby the first mentioned tube and holder are movable as a unit relative to the second mentioned tube, the second mentioned tube being rotatable upon and movable lengthwise over the support side just mentioned whereby the first and second mentioned tubes and said holder as a unit may be adjusted about the horizontal axis of the second mentioned tube and may be moved in unison laterally relative to the support, and supporting means for the first and second mentioned tubes and holder operable to hold the second mentioned tube in adjusted position relative to said support, including a substantially U-shaped bracket embracing and forming a bearing for the second mentioned tube and having attaching flanges spaced from and substantially parallel to the support side aforesaid, and fastening elements for the bracket engageable with said support side and operable to move the attaching flanges of the bracket relative to said support side to place said second mentioned tube under compression.

3. A rear view mirror mounting comprising a mirror holder, and pivotally connected elongated members for supporting the holder from a suitable support, said holder including a relatively thin sheet metal plate, a reinforcing and backing member for said plate, one of said elongated elements projecting at substantially right angles to the plate and having two complementary sheet metal parts, and a connection between said reinforcing and backing member and said plate including means holding said complementary parts together and connecting said parts to said plate.

4. A rear view mirror mounting comprising a mirror holder, and pivotally connected elongated members for supporting the holder from a suitable support, said holder including a relatively thin sheet metal plate having spaced openings therein, a reinforcing and backing member for said plate having openings registering with the openings in said plate, one of said elongated elements projecting at substantially right angles to said plate and having two complementary sheet metal parts, and a common means for holding said complementary parts together and for connecting said parts to said plate, including lugs projecting from said parts through the registering openings aforesaid and bent flat against said reinforcing and backing member.

FRED W. ZINK.